United States Patent [19]

Starnes, Jr.

[11] Patent Number: 4,940,504
[45] Date of Patent: * Jul. 10, 1990

[54] APPARATUS FOR EXTRUSION

[75] Inventor: Ralph E. Starnes, Jr., Carrollton, Ga.

[73] Assignee: Southwire Company, Carrollton, Ga.

[*] Notice: The portion of the term of this patent subsequent to Sep. 27, 2005 has been disclaimed.

[21] Appl. No.: 240,324

[22] Filed: Sep. 6, 1988

Related U.S. Application Data

[63] Continuation-in-part of Ser. No. 12,586, Feb. 9, 1987, Pat. No. 4,773,954.

[51] Int. Cl.$^5$ .............................................. B29B 47/02
[52] U.S. Cl. ................................ 156/500; 156/244.12; 264/262; 264/272.11; 264/279; 264/279.1; 425/113; 425/133.1; 425/378.1
[58] Field of Search ............................ 156/244.12, 500; 264/262, 272.11, 279, 279.1; 425/113, 133.1, 376

[56] References Cited

U.S. PATENT DOCUMENTS

| | | | |
|---|---|---|---|
| 3,305,893 | 2/1967 | Machen | 425/376 |
| 3,538,547 | 11/1970 | Drabb | 425/133.1 |
| 3,737,491 | 6/1973 | Nicholson | 425/113 |
| 4,585,407 | 4/1986 | Silver et al. | 425/133.1 |

Primary Examiner—Caleb Weston
Attorney, Agent, or Firm—Stanley L. Tate; James W. Wallis, Jr.

[57] ABSTRACT

A method of and apparatus for simultaneously extruding a coating comprising a plurality of layers of dissimilar plastic compounds having substantially different melting points onto a moving electrical conductor wherein the plastic compounds are mechanically and thermally separated and the conductor is centered in the plastic jackets by a center trim guide, said trim guide having replaceable guide tips. Separating the two plastics prevents thermal degradation of the two extrudates by causing their melt temperatures to remain substantially constant.

5 Claims, 6 Drawing Sheets

APPARATUS FOR EXTRUSION

RELATED U.S. APPLICATION DATA

This application is a Continuation-in-part of co-pending application filed Feb. 9, 1987; Ser. No. 07/012,586; to issue Sept. 27, 1988, as U.S. Pat. No. 4,773,954; Titled METHOD AND APPARATUS FOR EXTRUSION; and being the application of Ralph Emory Starnes.

TECHNICAL FIELD

This invention relates to an improved segmented crosshead, having an improved center guide means, or center trim device, for guiding an electrical conductor while said conductor is receiving an application of plastic coatings. More particularly, it relates to an improved center guide means for guiding said electrical conductor, said center guide means having replacable contact members which guide said wire as said wire is guided through said segmented crosshead.

BACKGROUND ART

The application of multiple layers of thermoplastic compounds onto an electrical conductor is well known within the industry. Several methods and devices for applying multiple layers of insulation to an electrical conductor are found in U.S. Pat. Nos. 4,303,734; 3,947,173; 3,903,233; 3,820,927; 3,222,721; 4,081,232; 3,581,343; 3,737,490; and 4,247,504.

U.S. Pat. No. 4,303,734 teaches the multiple layer extrusion of thermoplastics onto an electrical conductor with the outer layer being applied at a point outside the extruder head. U.S. Pat. Nos. 3,947,173 and 3,903,233 teach a method and an apparatus for the extrusion of concentric thermoplastic sheaths about an advancing filamentary core. The method and apparatus disclosed in U.S. Pat. Nos. 3,947,173 and 3,903,233 are adapted for the dual extrusion of one layer of a foamed or expanded thermoplastic which is surrounded by a non-foamed layer of a similar thermoplastic. Rotating core tooling is disclosed in U.S. Pat. No. 3,820,927 which provide dual extrusion apparatus whereby the material that is being applied as the inner layer can be applied as the outer layer and vice versa by rotating the core or tooling 180° within the crosshead. U.S. Pat. No. 3,222,721 teaches the application of two different colors of a similar thermoplastic over an electrical conductor as well as the application of a thermoplastic having protective properties over a more vulnerable thermoplastic by a dual extrusion process.

A fixed center extrusion die assembly for the application of a plurality of concentric layers of thermoplastic coating material over an advancing electrical conductor core is disclosed in U.S. Pat. No. 4,081,232. Apparatus for producing an extruded single layer tube including a centering device to guide an electrical conductor through an extrusion head and drawing the tube onto the conductor are shown in U.S. Pat. No. 3,581,343. U.S. Pat. No. 3,737,490 teaches the apparatus of a simple process for applying two similar thermoplastics and the continuous inline curing thereof. U.S. Pat. No. 4,247,504 teaches a method of using two separate crossheads to apply a plurality of coatings on an electrical conductor, with the second crosshead extruding two layers of equivalent material.

Applying multiple layers of different thermoplastic compounds to an electrical conductor allows desired physical, chemical and electrical properties of the different thermoplastics to be combined so that an optimum wire construction is achieved. An example of such a combination would be an inner layer of a compound that has superior electrical insulating properties and an outer layer that provides superior abrasion resistance or resistance to petroleum products.

The foregoing references relate to thermoplastic extrusion for coating electrical conductors or similar articles. Other methods of and apparatus for extruding thermoplastic materials through a crosshead are disclosed in U.S. Pat. Nos. 2,610,607; 2,521,123; 3,241,186; 4,056,344; and 3,461,197. It should be readily seen from the foregoing that the simultaneous application of two thermoplastic compositions to an electrical conductor is not unknown in the art and is in fact currently being practiced in the industry. It should also be evident from a reading of the above references that the successful application of a plurality of layers of thermoplastic insulating shielding has been accomplished when the thermoplastics have been of similar compositions or when the crossheads holding the extrusion tooling are remote from each other.

Many times it is desirable to apply dissimilar thermoplastic compounds which have very different melting temperatures to an electrical conductor. Generally, one of the two compounds has a much higher melting temperature than the other. The traditional method of accomplishing this multi-layered coating has been to apply the inner layer in one operation, and then to apply the outer layer in a separate step. This method of forming a multi-layered coating has several disadvantages, one of which is the cost of the extra processing steps. Another disadvantage of such a process is the increased possibility of damage to the product because of the additional handling inherent in the extra processing steps. Still another disadvantage is the extra time needed to carry out another processing step.

The application of a plurality of layers of dissimilar thermoplastics through a single segmented crosshead eliminates many of the disadvantages discussed above. One disadvantage eliminated is the extra processing steps and the additional costs associated therewith. Another disadvantage eliminated by the method and apparatus of the present invention is that of product damage which results from the extra processing steps thereby reducing product cost by reducing scrap. Elimination of an extra processing step also significantly decreases processing time required to manufacture the product which further reduces product cost.

Attempts have been made to apply multi-layered coatings of thermoplastics to electrical conductors in a single crosshead. These previous attempts have used methods and apparatus which were incapable of sustained operation, particularly when it is desired to coextrude thermoplastics with substantially different melting points. In these early attempts, the segment of the head through which the higher melting point thermoplastic flows became a source of unwanted heat for the portion of the head used to apply the lower melting point compound making control of head and melt temperatures difficult. Because systems were unable to control head and melt temperatures, the cooler portion of the head (that through which the lower melting thermoplastic compound passes) is heated by the hotter portion of the head (that through which the higher melting thermoplastic passes) thereby causing the lower melting thermoplastic to overheat. When a thermoplastic being extruded overheats, it begins to undergo thermal degradation which causes hard particles to form in the extrudate with resulting decrease in surface quality and electrical properties of the insulated product.

Attempts to overcome this problem have typically been made by trying to separate the head segments from each other with some type of heat insulating material such as asbestos. A typical apparatus is disclosed in U.S. Pat. No. 3,538,547. These solutions have failed because they did not sufficiently restrict the heat path between the individual head segments of the crosshead and the cooler segment continued to be overheated by the hotter segment. Such an apparatus only slows the rate at which the cooler segment reaches a temperature at which thermal degradation of the lower melting thermoplastic begins and as a result, when this temperature is reached and degradation occurs, the production process must be stopped and the burned thermoplastic compound removed from the tooling before production can be continued.

Attempts to provide tooling have typically consisted of center guide devices having a single diameter exit guide, such an arrangement would require the replacement of such a guide every time the diameter of the conductor being insulated was changed, as well as when the guide hole diameter changed through normal wear. Efforts to center the conductor within the plastic being applied thereon typically involve trying to guide the conductor as it enters the extrusion crosshead, or adjusting the tooling which places the insulation thereon. Internally adjustable wire guides are not well known within the industry.

DISCLOSURE OF THE INVENTION

Accordingly, it is an object of the present invention to provide an apparatus through which a plurality of layers of thermoplastic compounds having dissimilar application temperatures may be simultaneously applied, for extended periods of time, to an electrical conductor.

Another object of the present invention is to provide an apparatus through which a plurality of layers of thermoplastic compounds having dissimilar application temperatures may be simultaneously applied to an electrical conductor by juxtaposing a thermal barrier and heat dissipator between the segments of the segmented crosshead of the apparatus thereby allowing substantially continuous operation of the apparatus. This is accomplished by using the thermal barrier to retard heat migration from the hotter segment of the segmented head and using the dissipator to remove and dissipate any heat passing through the barrier before it reaches the cooler head segment. This prevents overheating the cooler segment of the segmented crosshead.

Still another object of the present invention is to provide an apparatus that will allow the application of dissimilar thermoplastic compounds to a plurality of sizes of electrical conductors without the necessity of stopping the production process and changing the internal tooling portions of the segmented crosshead assembly.

Even another object of the present invention is to provide an apparatus that will allow the application of dissimilar thermoplastic compounds to a plurality of sizes of electrical conductors by using a center trim device, said device having adjustable fingers, for guiding an electrical conductor through the crosshead.

And even another object of the present invention is to provide an apparatus having a center trim means, said means having adjustable fingers, and said fingers having replaceable guide tips.

Yet another object of the present invention is to provide an apparatus that will allow the application of dissimilar thermoplastic compounds to an electrical conductor by simultaneously allowing a plurality of layers of thermoplastic compounds having substantially different melting temperatures to be applied to an electrical conductor by tubing, pressure extrusion, or a combination of tubing and pressure extrusion techniques.

Even another object of the present invention is to provide an apparatus through which multiple layers of thermoplastic compounds or thermosetting compounds may be extruded onto an electrical conductor.

A principal feature of the present invention is the provision of a segmented extrusion crosshead that will allow the application of a plurality of layers of dissimilar thermoplastic compounds onto an electrical conductor by forming a multi-layer tube of the dissimilar thermoplastic compounds and then substantially simultaneously drawing said multi-layer tube onto the electrical conductor.

Another feature of the present invention is the provision of a segmented extruder crosshead that will allow the application of a plurality of layers of dissimilar thermoplastic compounds onto an electrical conductor by simultaneously pressure extruding an inner layer of thermoplastic compound onto said electrical conductor and extruding a tube of another thermoplastic compound which is drawn onto the inner layer as it exits the segmented crosshead.

Even another important feature of the present invention is the provision of an apparatus that will allow the application of a plurality of layers of dissimilar thermoplastic compounds onto an electrical conductor by simultaneously extruding a tube of thermoplastic compound which is drawn onto the electrical conductor to form an insulating inner layer and extruding a tube around the inner layer which is drawn onto the inner layer as it leaves the segmented crosshead to form an outer layer.

Still another important feature of the present invention is the provision of a segmented extruder crosshead that will allow the application of a plurality of layers of dissimilar plastic compounds onto an electrical conductor by pressure extruding an inner layer of plastic compound onto the electrical conductor and then pressure extruding an outer layer of another plastic compound onto the inner layer of compound.

An additional important feature of the present invention is the provision of a segmented crosshead having segmented tooling fitted with a means for transferring heat from the tooling to the thermal separator juxtaposed between the segments of the segmented crosshead.

Yet another feature of the present invention is the provision of a segmented crosshead utilizing segmented tooling that is fitted with a means for preventing the transfer of heat from one segment of the tooling to another segment of the tooling.

Even another feature of the present invention is the provision of a segmented crosshead utilizing segmented tooling whereby a thermal separator is juxtaposed between heat barrier segments allowing removal of heat from the segmented tooling.

Another important feature of the present invention is the provision of a segmented crosshead having a thermal separator jaxtaposed between the segments of the segmented crosshead with the crosshead utilizing segmented tooling and the tooling having a thermal separator juxtaposed between heat barrier segments whereby heat is removed from the tooling by the tooling thermal separator and the heat is transferred to the thermal separator of the segmented crosshead.

And yet another feature of the present invention is the provision of a segmented crosshead having a thermal separator juxtaposed between heat barrier segments of the segmented crosshead. The segmented crosshead utilizes segmented tooling and the tooling has a thermal separator juxtaposed between the segments of the tooling. Heat removed from the tooling by the tooling thermal separator is transferred to the thermal separator juxtaposed between heat barrier segments of the segmented crosshead where it is then transferred to the heat dissipator and dissipated. This allows a substantially continuous application of different thermoplastic compounds having greatly different melting points because the heat generated by the higher temperature thermoplastic compound is prevented from overheating the internal tooling segment through which passes the thermoplastic compound having the lower melting point.

Still another feature of the present invention is the provision of tooling for the low melting point plastic which can be changed without disturbing the tooling for the high melting point plastic.

And yet even another feature of the present invention is the provision of a center trim means having replaceable guide tips, said tips serving to guide conductors passing through the segmented crosshead.

And yet even another feature of the present invention is the provision of a center trim means suitable for adapting to various wire sizes.

Another feature of the present invention is the provision of replaceable tips for the finger guides of the center trim means.

And still even another feature of the present invention is the provision of tooling for guiding electrical conductors through a segmented crosshead, said guide having a replaceable one piece guide tip.

One advantage of the present invention is the extention of time that a plurality of thermoplastic compounds having greatly differing melting points can be applied to an electrical conductor through a single segmented crosshead.

Another advantage of the present invention is the ability to utilize a single segmented crosshead and various combinations of internal tooling to accomplish the simultaneous application of a plurality of layers of thermoplastic compounds onto an electrical conductor by pressure extrusion, tubing, or a combination of pressure extrusion and tubing.

Still another advantage of the present invention is the ability to segregate, isolate, and prevent the transfer of heat from one segment of a segmented crosshead to another segment of the segmented crosshead through the use of a thermal separator and insulation means placed between the segments of the segmented crosshead.

An additional advantage of the present invention is a greater control of the concentricity of the thermoplastic coatings applied to the conductor through the use of an adjustable center trimming means within the segmented crosshead.

A further advantage of the present invention is the ability to monitor the temperature of the individual segments of the segmented crosshead and the ability to add heat to an individual segment as the process requires.

Even another advantage of the present invention is the extention of the useful life of the guide means by separately forming and attaching tips to the fingers used in the trimming portion of the guide means.

Still another advantage of the present invention is the ability to segregate, prevent the migration of, and remove heat from the segment of the internal tooling which is guiding the thermoplastic compound having the higher melting point from the segment of the tooling through which passes the thermoplastic compound having the lower melting point before the segment through which passes the thermoplastic compound having the lower melting point overheats and necessitates the interruption of the application process.

Yet even another advantage of the present invention is the ability to change the conductor size and/or the conductor configuration onto which the thermoplastic coatings are being applied without the necessity of stopping the process and changing the internal tooling of the segmented crosshead.

Still even another advantage of the present invention is the ability to interrupt the application of either of the thermoplastics being applied to a conductor and to allow a single layer of the other thermoplastic to continue to be applied to said conductor without having to stop the process and change the internal tooling of the segmented crosshead, and then to return to the process of simultaneously applying a plurality of layers onto said conductor again without the necessity of interrupting the application process.

A further advantage of the present invention is the ability to utilize a single center trim means for a plurality of wire sizes.

And yet even another advantage of the present invention is the ability to replace a worn guide tip, thereby extending the useful life of the center trim means.

And even another advantage of the present invention is the ability to change the wire size being coated with plastic insulation compounds, without the need to remove or replace the center trim tooling.

Another advantage of the present invention is the ability to control the centering within the insulated jacket of the conductor being insulated within the insulated jacket.

In accordance with these and other objects, features, and advantages of the present invention, there is provided a method of and an apparatus for the simultaneous application of dissimilar thermoplastic compounds having greatly different melting points onto an electrical conductor, said application being for extended periods of time.

Also in accordance with the present invention there is provided an apparatus containing thermal separators in both the segmented crosshead as well as the segmented internal tooling which allows for the removal of excess heat from the hotter of either of the segments prior to the transfer of this heat to the cooler segment of its respective counterpart.

In accordance with the present invention there is provided an apparatus and method for removing heat from the segmented tooling and transfering this heat to the thermal separator of the segmented crosshead.

Also in accordance with the present invention there is provided an apparatus and method for controlling the concentricity of the thermoplastic coatings being applied to the electrical conductor. Control is achieved by using an internal trimming means which may be adjusted to accommodate conductors having various diameters and conductors having various configurations passing through said trimming means and it may also be adjusted so that the conductor is centered relative to the bore of the tooling where the thermoplastic coating is being applied.

In accordance with the present invention there is provided an apparatus for and method of guiding and centering the conductor in the internal tooling of the segmented crosshead wherein the tips of the fingers or the annular insert of the guide are replacable and are composed of a material having a relatively low coefficient of friction. This reduces the resistance to the conductor as it is being guided through the segmented crosshead tooling and reduces the likelihood of damage to the conductor while also extending the use life of the guide itself.

Also in accordance with the present invention there is provided an apparatus for and method of guiding and centering the conductor in the internal tooling of the segmented crosshead, wherein the tip of the center trim means is completely replaceable as a unit.

In accordance with the present invention, there is provided an apparatus for and method of guiding and centering the conductor in the internal tooling of the segmented crosshead, wherein the tips of the guide fingers are pivotably mounted and are individually replaceable.

In accordance with the present invention there is provided an apparatus for and method of monitoring the temperature of the individual crosshead segments and individual heating means which heat the individual segments of the crosshead in order to maintain the proper operating temperature for the individual crosshead segments.

In accordance with the present invention there is provided an apparatus for and method of simultaneously applying a plurality of thermoplastic coatings having greatly different melting points onto an electrical conductor through a single segmented crosshead by a combination of pressure extruding both layers or tubing and drawing both layers or pressure extruding and tubing and drawing the individual layers onto the conductor.

BEST MODE FOR CARRYING OUT THE INVENTION

Figure 1:
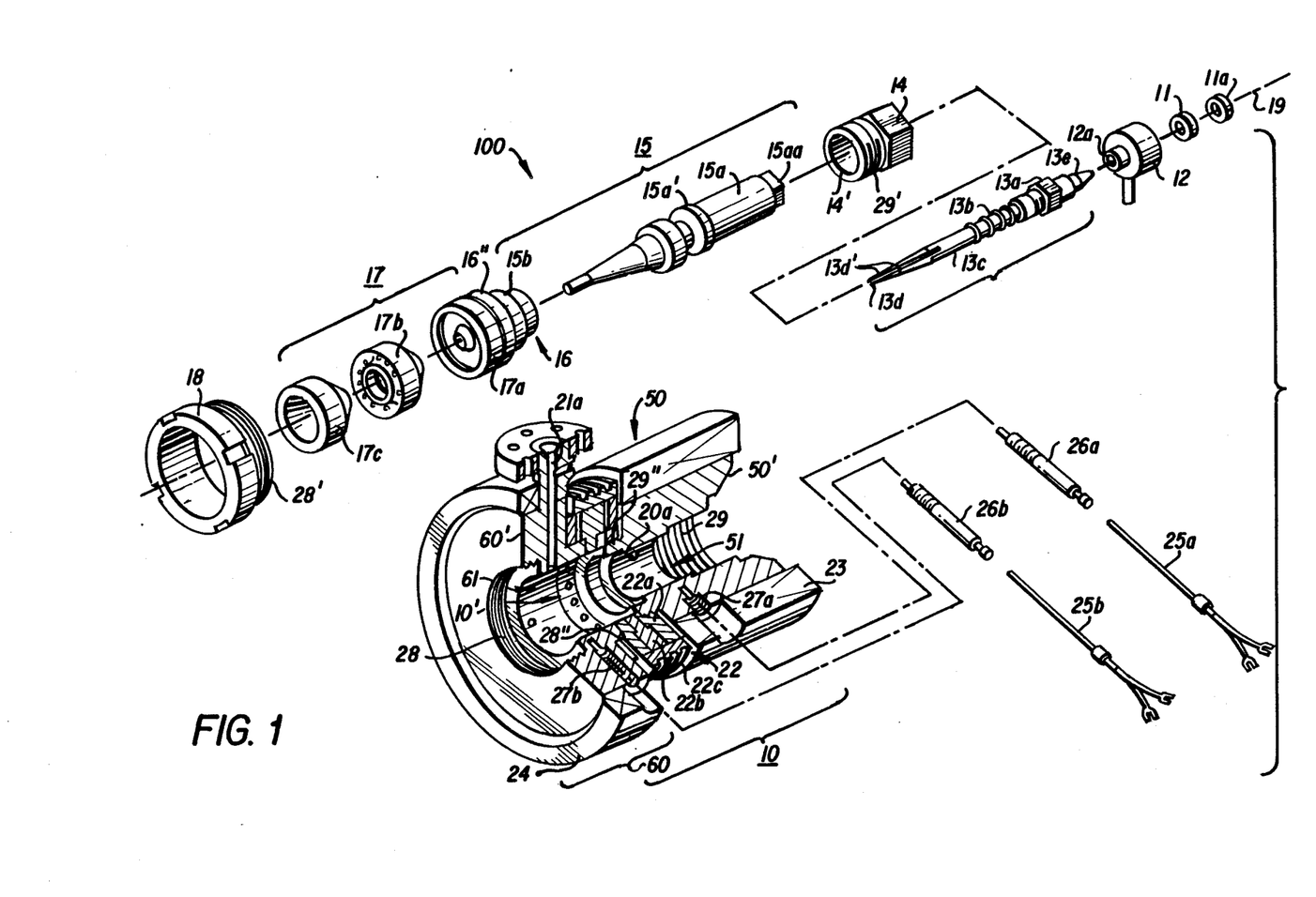
FIG. 1 is an exploded partial cross-sectional view of the present invention generally illustrating its major components.

Referring now to FIG. 1, which is an exploded partial cross-sectional view of the present invention illustrating the major functional components which comprise the segmented crosshead 10 and the segmented tooling assembly 100 and the general form in which each is assembled. The component which most directly operates upon a moving conductor 19 as it passes through crosshead 10 is tooling assembly 100 which comprises: die wire guide 11, vacuum adapter 12, guide means 13, insulation tip holder 14, insulation tooling 15, tooling thermal separator 16, jacket tooling 17, and jacket tooling retainer 18.

Conductor 19 enters tooling assembly 100 through die wire guide 11 which centers conductor 19 relative to functional components of tooling assembly 100 by acting as an entry guide and by reducing vibration in the rapidly moving conductor 19. Die wire guide 11 nests in vacuum adapter 12 and is held in place by the movement of conductor 19 through tooling assembly 100 within crosshead 10 and by seal 11a which is held firmly against die wire guide when pressure inside the crosshead is reduced by pulling a vacuum through adaptor 12 and by the frictional forces resulting from movement of conductor 19 through seal 11a and die wire guide 11. Vacuum adapter 12 is held in place by taper 13e with a set screw 12a which locks adaptor 12 to guide means 13. Guide means 13 fixes the position of conductor 19 coaxial with tooling 100, insulation 40 (see FIG. 4), jacket 41 (see FIG. 4) and other functional components of crosshead 10.

Guide means 13 extends into insulation tooling 15 such that chuck jaws 13d' expand or contract relative to the depth that guide means 13 extends into tooling 15. The amount of expansion or contraction of chuck jaws 13d' is controlled by the tension applied to spring 13b by threading nut 13a into threaded opening 15aa of tip 15a. Insulation tip 15a mates with insulation die 15b and is held in place by insulation tip holder 14 which threads into the postereior end 29 of crosshead bore 10'. Insulation die 15b is formed on the posterior end of thermal separator 16 and jacket tip 17a is machined into the anterior end of thermal separator 16. Jacket die 17b nests within jacket tip 17a and is held in proper position by jacket tip holder 17c which is locked into place by threaded jacket tooling retainer 18 which threads into anterior end 28 of crosshead bore 10'.

The exit end 13d of the center trim 13c may take any of several forms. This exit end 13d acts as the final guide for the moving conductor 19 as it passes through the tooling 100. The preferred configuration of this exit is a finger type arrangement as described hereinafter. Insulation tip holder 14 has a threaded member 29' and is attached to segmented crosshead 10 at threaded entrance 29 of first or insulation segment 50 of segmented crosshead 10. Insulation tip holder 14 secures segments of segmented tooling 100 that are contained by and function within insulation segment 50 of segmented crosshead 10. An assembly 15 for guiding and applying the thermoplastic compound that will be applied as the inner layer or insulation 40 (see FIG. 4) of conductor 19 comprises insulation tip 15a and insulation die 15b. Tooling thermal separator 16 is used to remove heat from tooling 100 and transfer it to crosshead thermal separator 22 of segmented head 10 before the heat migrates from the hotter segment of tooling 100 to the cooler segment of tooling 100 which could cause the cooler segment to overheat. Jacket back die 17a, jacket tip die 17b and jacket tip holder 17c act together in guiding and applying the outer layer or jacket 41 (see FIG. 4) of the dissimilar thermoplastic materials being applied to conductor 19.

Figure 1A:
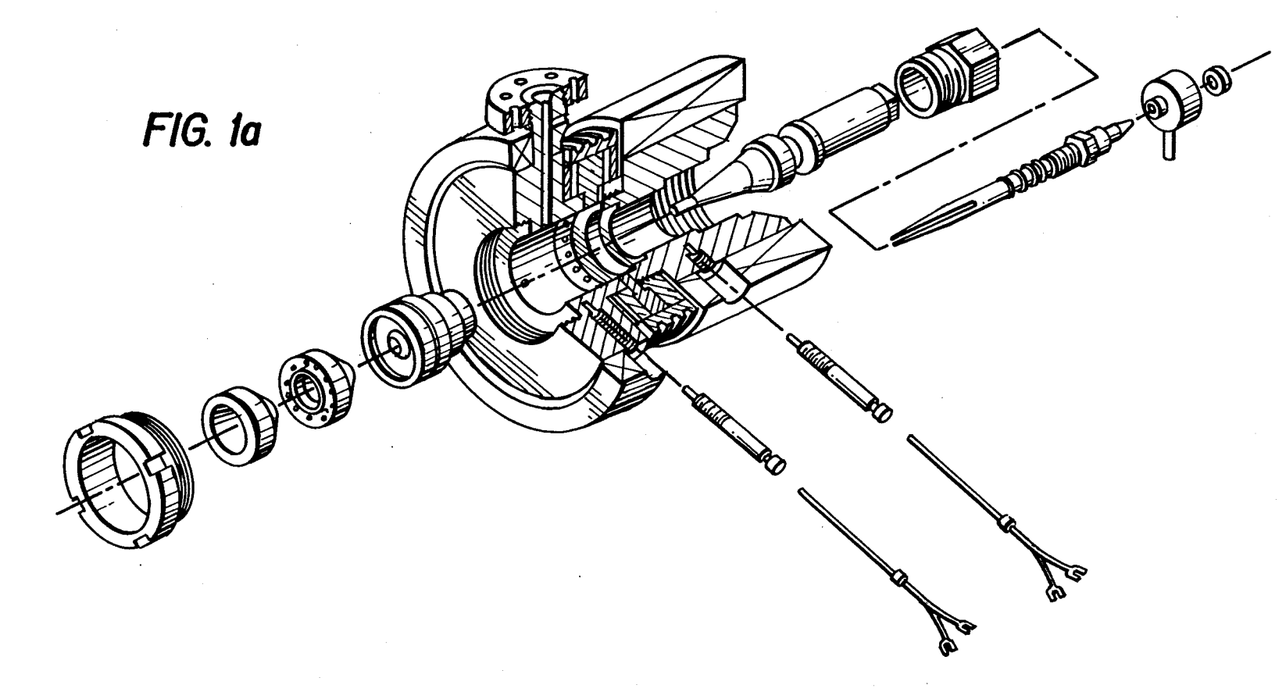
FIG. 1a is an exploded partial cross-sectional view of the present invention generally illustrating the relative positioning of its major components.

Insulation die 15b, tooling thermal separator 16, jacket back die 17a, jacket tip die 17b, and jacket tip holder 17c are secured in second or jacket segment 60 of segmented crosshead 10 by threads 28' of jacket tooling retainer 18 at threaded exit 28 of segmented crosshead 10. Segmented tooling assembly 100 is shown in FIG. 1 in an exploded view and separate from segmented crosshead 10. In its operational configuration, segmented tooling assembly 100 is contained by and functions within the axial bore 10' of segmented crosshead 10 as indicated in FIG. 1a.

Segmented crosshead 10 comprises: first segment 50, second segment 60, crosshead thermal separator 22, axial bore 10', channel 20a, channel 21a, first heat means 23, second heat means 24, heat monitors 25a and 25b, protective sleeves 26a and 26b, threaded recesses 27a and 27b, threaded entrance 29, threaded exit 28, and tooling 100. First segment 50 is the segment of segmented crosshead 10 through which the insulation layer 40 (see FIG. 4) of dissimilar plastic is applied to moving conductor 19. First segment 50 comprises: cylindrical body 50', axial bore 51, threaded entrance 29, male threaded fastening member 29'', channel 20a, first heat means 23, first threaded recess 27a, first protective sleeve 26a, and first heat monitor 25a. First segment 50 contains die wire guide 11, vacuum adapter 12, guide means 13, insulation tip holder 14, and insulation tip 15a of segmented tooling assembly 100.

Axial bore 51 of cylindrical body 50' houses the insulation tip 15a which is secured therein by threading threaded portion 29' of insulation tip holder 14 into threaded entrance 29 of axial bore 51. Bearing face 14' of insulation tip holder 14 holds against locking face 15a' of insulation tip 15a and prevents rearward movement of insulation tip 15a.

Second segment 60 of crosshead 10, that portion of crosshead 10 through which jacket 41 (see FIG. 4) is applied to moving conductor 19, comprises: cylindrical body 60', axial bore 61, threaded exit 28, male threaded fastening member 28'', channel 21a, second heat means 24, second threaded recess 27b, second protective sleeve 26b, and second heat monitor 25b. Jacket segment 60 contains insulation die 15b, metallic ring or heat riser 16'', jacket back die 17a, jacket tip die 17b, jacket tip holder 17c, and jacket tooling retainer 18 of tooling assembly 100.

Although listed as three separate segments and identified as insulation die 15b, metallic ring or heat riser 16'', and jacket back die 17a, segments identified as insulation die 15b and jacket back die 17a are fabricated by machining the opposite ends of a single mass. Thermal separator 16 is formed when a groove 16' is machined into the single mass and a metallic ring 16'' is placed therein. From the above description, it can be seen how insulation die 15b, metallic ring 16'', and jacket back die 17a are formed and inserted into second segment 60 of segmented crosshead 10 as a single segment which is contained by axial bore 61 of cylindrical body 60'. Segment assembly 16 indexes against indexing shoulder 15b' (see FIG. 2) and is axially contained by bore 61.

Insulation segment 50 threads into thermal separator 22 at 29'' and jacket segment 60 threads into thermal separator 22 at 28'' and when joined with all components in place form crosshead 10.

Insulation is fed to insulation tooling 15 from an extruder barrel (not shown) through channel 20a which passes through cylindrical body 50' of first segment 50 of the crosshead 10. Jacket material in a plastic state is fed to jacket tooling 17 from a second extruder barrel (not shown) through channel 21a which passes through cylindrical body 60' of second segment 60 of crosshead 10. Insulation tip 15a and insulation die 15b form channel 20 which is affectively an extension of channel 20a within the tooling 15 that guides the thermoplastic compound as it passes through crosshead 10. Jacket back die 17a, jacket tip die 17b, and jacket tip holder 17c form channel 21 which is an extension of channel 21a within the tooling 17 that guides the thermoplastic jacket compound to the conductor. Tooling thermal separator 16 prevents the flow of heat from the hotter segment of the segmented tooling 100 to the cooler segment of tooling 100. First heat means 23 and second heat means 24 supply heat to the respective insulation and jacket segments of the crosshead 10 so that heat may be added to an individual crosshead segment in order to maintain an appropriate melt for the plastic being applied through that segment. Temperatures of the first and second crosshead segments are monitored by heat monitors 25a and 25b respectively which are contained within protective sleeves 26a and 26b and are thereby secured in crosshead 10 in threaded recesses 27a and 27b.

Crosshead thermal separator 22 is juxtaposed between segments of segmented crosshead 10. This assembly comprises thermal isolator 22a which has a lower thermal conductivity than, and encloses, heat riser 22b which is in contact with heat dissipator 22c. Heat passing through thermal isolator 22a is transferred through heat riser 22b to heat dissipator 22c. Heat riser 22b has a higher thermal conductivity than thermal isolator 22a and can therefore transfer the heat to heat dissipator 22c at a rate greater than heat can pass through thermal isolator 22a. Thus heat is removed from the system before it can migrate from the hotter segment of the crosshead 10 to the cooler segment thereof and cause thermal degradation of the extrudate.

This general configuration of the invention is typical of variations of the assembly. Variations in the configurations of insulation tip 15a, die 15b for applying the insulation layer of compound, back die 17a for applying the jacket layer of thermoplastic, tip die 17b for applying the jacket layer of thermoplastic, and tip holder 17c for the jacket layer of thermoplastic will allow the user to vary the method of application of the dissimilar thermoplastic layers.

Figure 2:
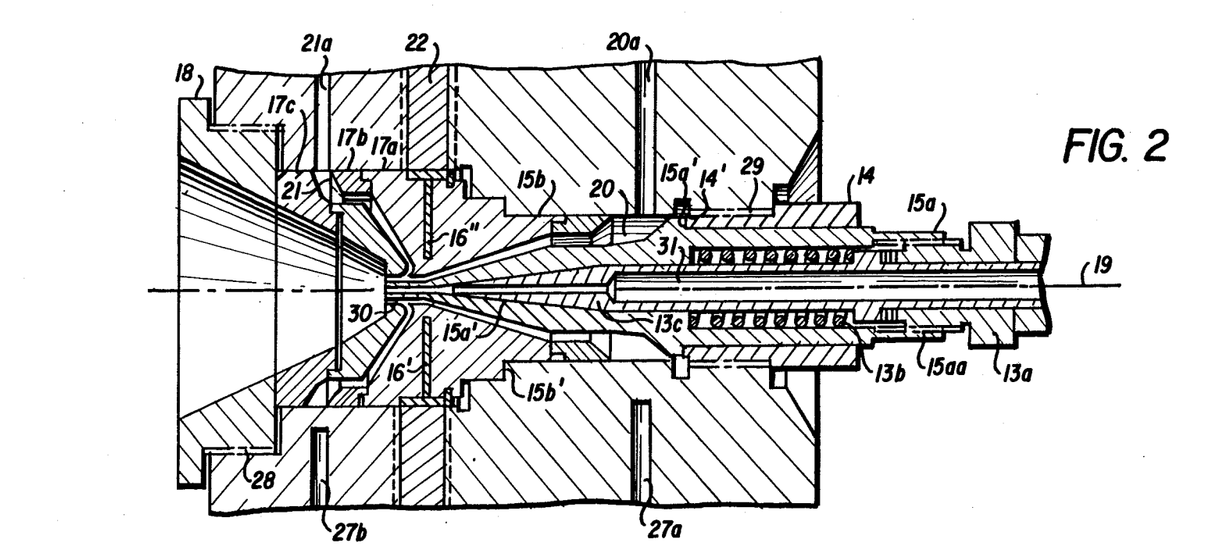
FIG. 2 is a cross-sectional view of the present invention configured to extrude a multi-layered tube which is drawn onto a moving conductor.

A cross-sectional view of the present invention configured to produce a multi-layered tube (not shown) which is drawn down onto advancing conductor 19 is shown in FIG. 2. The thermoplastic compound that forms the insulation layer 40 (see FIG. 4) of the multi-layered tube (not shown) flows into crosshead 10 from the extruder barrel (not shown) through channel 20a and once inside crosshead 10 into channel 20 which is formed by insulation tip 15a and the member comprising the die 15b for application of the insulation 40 (see FIG. 4). Jacket compound that forms jacket 41 (see FIG. 4) of the multi-layered tube (not shown) enters crosshead 10 through channel 21a and thereafter follows channel 21 which is formed by back die 17a and tip die 17b and combines at the mouth 30 of tooling 100 with insulation 40 (see FIG. 4) to form multi-layered tube (not shown) which is drawn onto conductor 19 by pulling a vacuum on the system through vacuum adaptor 12.

Tooling thermal separator 16 removes the heat generated by the hotter of the two thermoplastic compounds and transfers it to crosshead thermal separator 22 juxtaposed between the segments of crosshead 10. Here the heat is removed and dissipated before the cooler segment of the tooling overheats as previously described. Thermal separator 22 in some configurations has been found to be so efficient that extreme care is required to avoid excessive cooling of the extrudates in head 10 which could result in the thermoplastic materials freezing in the crosshead.

Figure 3:
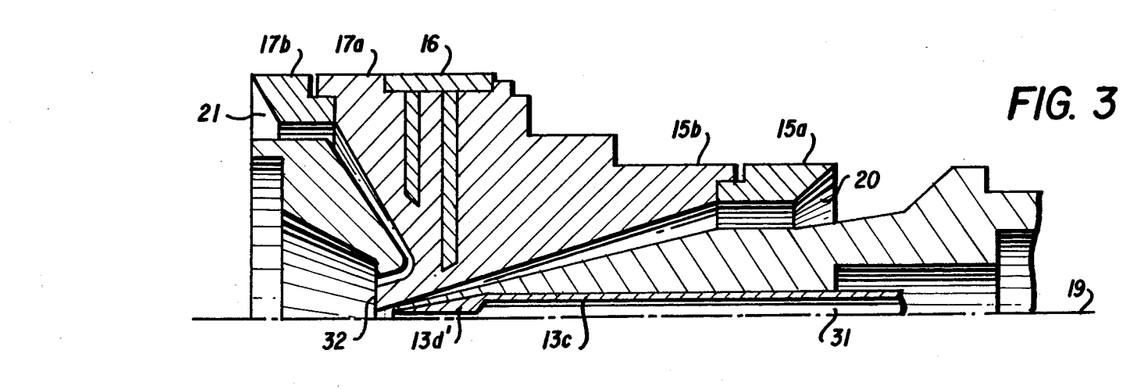
FIG. 3 is a partial cross-sectional view of the present invention configured to pressure extrude the insulation layer and tube the jacket onto a moving conductor.
Figures 4, 5:
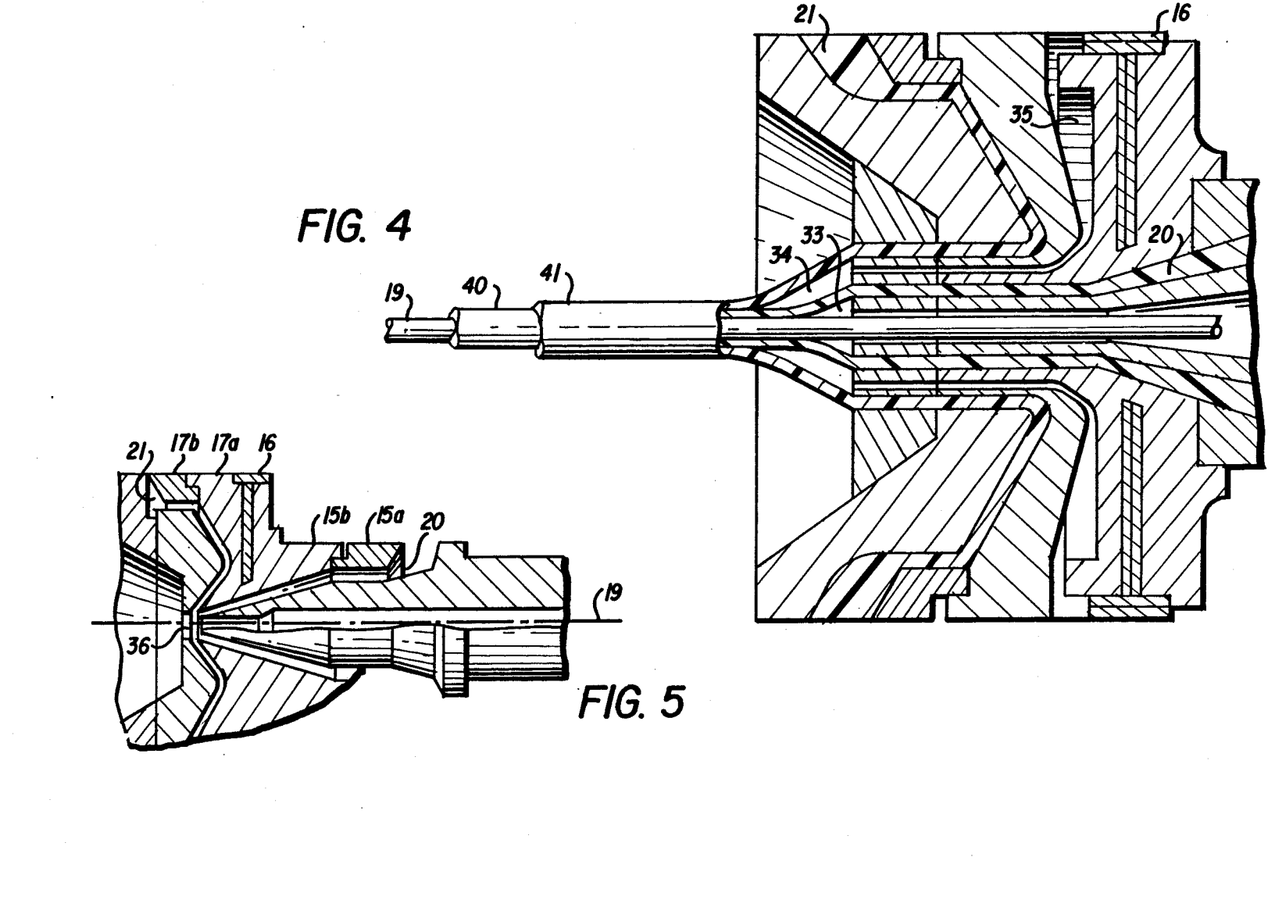
FIG. 4 is a cross-sectional view of the present invention configured to extrude a tube of insulation onto a moving conductor and to extrude a jacket tube which is drawn down onto the moving insulated conductor.
FIG. 5 is a partial cross-sectional view of the present invention in a configuration for pressure extruding both insulation and jacket onto a moving electrical conductor.

FIG. 3 is a cross-sectional representation of tooling set up to pressure extrude the insulation 40 (see FIG. 4) onto moving conductor 19 and tube and draw the jacket 41 (see FIG. 4) onto the previously applied insulation 40 (see FIG. 4). In this embodiment, conductor 19 passes through bore 31 of center trim 13c, and is positioned by the guide formed by chuck jaws 13d'. Insulation enters crosshead 10 (see FIG. 2) through channel 20a (see FIG. 2) which cooperates with channel 20 as previously described in more detail and is pressure extruded onto conductor 19 as it exits channel 20. The thermoplastic jacket 41 simultaneously flows through channel 21a (see FIG. 2) to channel 21 as herein before described and emerges from tooling 100 at the end 32 of extrusion die to form a tube (not shown) which is drawn onto the insulated conductor 19. As previously described, the tooling thermal separator 16 removes the heat generated by the hotter thermoplastic compound and removes it from the tooling 100 before it can pass to the cooler of the segments of the tooling.

FIG. 4 represents a tooling set-up that allows the multiple coatings to be individually tubed and individually drawn down, substantially simultaneously, onto moving conductor 19. The thermoplastic compound to be tubed and drawn down as the insulation 40 of the plurality of coatings is introduced through a channel 20a (see FIG. 2) which cooperates with channel 20 formed as previously described. This material is extruded as a tube at insulator die exit 33 and drawn down onto the moving conductor 19 by pulling vacuum on the system through vacuum adaptor 12. This also permits gases to be removed from between the conductor 19 and the insulation 40 and eliminates voids and porosity in the insulation 40. Jacket compound enters head 10 through channel 21a (see FIG. 2) which cooperates with channel 21 formed as previously described. This thermoplastic material is extruded as a tube at jacket die exit 34 and is drawn down onto the layer of compound 40 that was previously drawn down onto the conductor 19 by pulling a vacuum through vacuum channel 35 which also permits gases to be removed from between the two tubes being applied to the moving conductor 19 thus preventing gases from being trapped between the layers of thermoplastic, insures a smooth jacket 41 and eliminates voids in the jacket 41 itself.

FIG. 5 represents a tooling set-up that allows multiple coatings of thermoplastic compound to be substantially simultaneously pressure extruded onto the moving conductor 19. The thermoplastic material to be applied as insulation 40 of the plurality of layers is introduced through a channel 20a (see FIG. 2) in the segmented crosshead 10 which cooperates with a channel 20 that is formed by the internal tooling as described above. The thermoplastic material to be applied as the jacket 41 of the plurality of layers is introduced through a channel 21a (see FIG. 2) in the segmented crosshead 10 which cooperates with a channel 21 formed by the internal tooling as described above. These two layers of thermoplastic material are substantially simultaneously pressure extruded onto the moving conductor 19 at the mouth 36 of the extrusion die.

Figure 6:
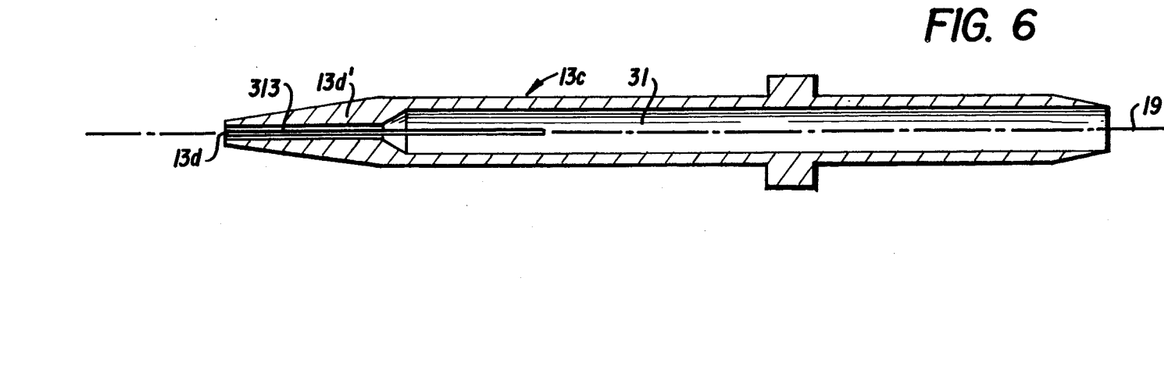
FIG. 6 is a cross sectional view of the present invention generally illustrating the position of its replacable finger tip members.

FIG. 6 represents the relative position of the replaceable finger tips 313 of the present invention. Moving conductor 19 passes through bore 31 of center trim 13c where replacable tips 313 of finger 13d' bear on moving conductor 19 as it passes through center trim 13c at its exit end 13d.

Figure 7:
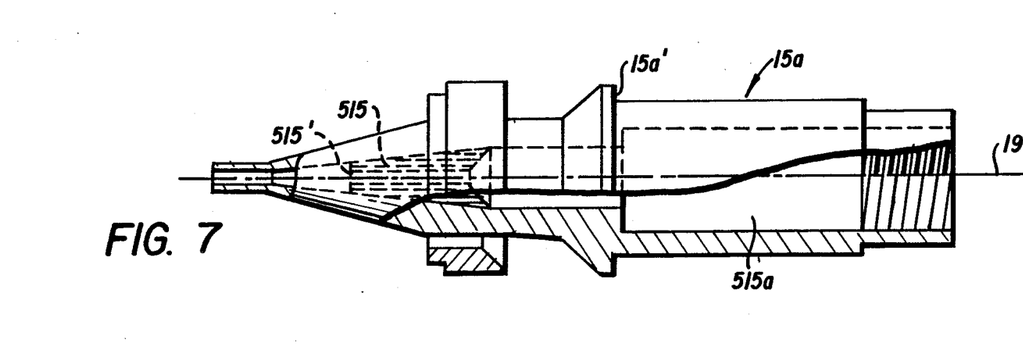
FIG. 7 is a cross sectional view of the present invention generally illustrating the position of its replacable tip insert member.

FIG. 7 represents the relative position of the replaceable insert 515 of the present invention. Moving conductor 19 passes through bore 515a of insulation tip 15a where moving conductor 19 is held in a predetermined position by the axial bore 515' of replacable insert 515 of insulation tip 15a. Insulation tip 15a is secured within segmented crosshead 10 (see FIG. 1) by threading threaded portion 29' (see FIG. 2) of insulation tip holder 14 (see FIG. 2) into threaded entrance 29 (see FIG. 2) of axial bore 51 (see FIG. 2). Bearing face 14' (see FIG. 2) of insulation tip holder 14 (see FIG. 2) holds against locking face 15a' (see FIG. 2) of insulation tip 15a and prevents rearward movement of insulation tip 15a.

Although the present invention has been discussed and described with primary emphasis on one preferred embodiment, it should be obvious that adaptations and modifications can be made thereto without departing from the spirit and scope of the invention.

What is claimed is:

1. Apparatus for extruding a coating of two layers of dissimilar plastic compounds having substantially different melting points onto an electrical conductor, said apparatus having:
   a segmented head having first and second segments and having enlarged first and second end openings connected by a main axial bore smaller than the diameter of said end openings to provide inwardly disposed annular shoulders at the base of said openings, said bore extending through said first and second segments;
   a first passageway in said first segment for applying the plastic composition which forms the inner layer of said coating of said electrical conductor;
   a second passageway in said second segment for applying the plastic composition which forms the outer layer of said coating of said electrical conductor;
   segmented internal tooling having first and second segments for guiding and applying the plastic compositions which form the inner and outer layers of said coating of said conductor, said tooling having a plurality of segments and having first and second end openings connected by a main axial bore, said bore extending through said plurality of segments;

a means for passing an electrical conductor through said axial bore of said internal tooling;

a means interposed between said first and second internal tooling segments for thermally isolating said first segment from said second segment;

a heatsink means interposed between said first and second internal tooling segments for removing excess heat flowing from the segment through which passes the higher melting point plastic composition and from the plastic composition flowing through said segment;

a means for monitoring the temperature in said first and said second internal tooling segments;

a guide means for maintaining the position of said electrical conductor within said main axial bore of said segmented internal tooling while said coating is applied to said conductor, said guide means having a trimming insert means and said insert having a first or entrance end and a second or exit end connected by an axial bore adopted to align with the axis of said main axial bore when adjustably positioned within the axial bore of said segmented tooling;

said guide means having a tensioning means to apply force to said insert counter to the direction of movement of said electrical conductor through said segmented head whereby said electrical conductor is held in a constant position relative to the axial bore of said segmented head and said first and second passageways and;

said guide means having a securing means to secure said trimming insert to said segmented head, THE IMPROVEMENT WHICH COMPRISES:

replaceable tip attached to the second or exit end of said trimming insert means.

2. The apparatus of claim 1, wherein said trimming insert means comprises a single replaceable tip.

3. The apparatus of claim 1, wherein said trimming insert means further comprises fingers formed when longitudinal cuts are made approximately 90° to each other on the exit end of said trimming insert, said fingers having tips secured thereon.

4. The apparatus of claim 3, wherein individual tips are formed and attached pivotably to the exit end of said fingers of said trimming insert means.

5. The apparatus of claim 3, wherein individual tips are formed and rigidly attached to the exit end of said fingers of said trimming insert means.

* * * * *